United States Patent
Yao

(10) Patent No.: US 9,433,915 B2
(45) Date of Patent: Sep. 6, 2016

(54) RECTIFIER MOUNTED AT BOTTOM OF REACTOR

(76) Inventor: Guangchun Yao, Jiangxi (CN)

( * ) Notice: Subject to any disclaimer, the term of this patent is extended or adjusted under 35 U.S.C. 154(b) by 718 days.

(21) Appl. No.: 13/884,933

(22) PCT Filed: Mar. 10, 2011

(86) PCT No.: PCT/CN2011/000379
§ 371 (c)(1),
(2), (4) Date: Jul. 17, 2013

(87) PCT Pub. No.: WO2012/062025
PCT Pub. Date: May 18, 2012

(65) Prior Publication Data
US 2014/0021009 A1    Jan. 23, 2014

(30) Foreign Application Priority Data
Nov. 10, 2010  (CN) .......................... 2010 1 0540883

(51) Int. Cl.
*B01J 19/00* (2006.01)
*B01J 19/24* (2006.01)
*C10G 1/02* (2006.01)

(52) U.S. Cl.
CPC ......... *B01J 19/0066* (2013.01); *B01J 19/0053* (2013.01); *B01J 19/2485* (2013.01); *C10G 1/02* (2013.01); *B01J 2219/2404* (2013.01); *B01J 2219/2407* (2013.01); *B01J 2219/2408* (2013.01); *B01J 2219/2419* (2013.01); *B01J 2219/2438* (2013.01); *B01J 2219/2441* (2013.01); *B01J 2219/2446* (2013.01)

(58) Field of Classification Search
CPC .............. B01J 19/0053; B01J 19/0066; B01J 19/2485; C10G 1/02
USPC ........ 422/310, 220, 222, 224, 129; 428/116, 428/118, 593; 138/37, 40, 44; 239/558; 196/46, 129, 130, 135, 111
See application file for complete search history.

(56) References Cited

U.S. PATENT DOCUMENTS 3,572,391 A  *  3/1971  Hirsch .................. F15D 1/0005
                                                       138/37
6,803,482 B2 * 10/2004  Jenne .................... C07C 263/10
                                                       560/347

* cited by examiner

*Primary Examiner* — Jill Warden
*Assistant Examiner* — Joye L Woodard

(57) ABSTRACT

A rectifier mounted at a bottom of a reactor includes a central layer (1), at least one interlayer (2) and an external layer (3), which are made of bird nest honeycomb ceramic, wherein porosities of the central layer, the interlayer and the external layer increase in turn. The central layer, the interlayer and the external layer are respectively provided in a central-layer cone shaped body, an interlayer cone shaped body and an external-layer cone shaped body which are installed concentrically, so as to form meshed honeycomb pores with different porosities at the bottom of the rectifier. The rectifier is made of bird nest ceramic with high density honeycomb pores, and a minimum density thereof is over 200 meshes.

1 Claim, 1 Drawing Sheet

RECTIFIER MOUNTED AT BOTTOM OF REACTOR

CROSS REFERENCE OF RELATED APPLICATION

This is a U.S. National Stage under 35 U.S.C 371 of the International Application PCT/CN2011/000379, filed Mar. 10, 2011, which claims priority under 35 U.S.C. 119(a-d) to CN 201010540883.7, filed Nov. 10, 2010.

BACKGROUND OF THE PRESENT INVENTION

1. Field of Invention

The present invention relates to a rectifier for a smelting reactor in petrochemical industry, and more particularly to a rectifier for raw oil in a reactor.

2. Description of Related Arts

It is well known that due to reflection of short circuit and turbulence, radial resistant forces of the liquid oil at the bottom of the reactor have a great difference in size. It is the very difference causes uneven liquid-oil distribution in a base at the bottom and forms a distribution status that fluid drag force thereof is greater in the center and smaller in the periphery, which reduces application effect of the base, so that reaction efficiency of the reactor is affected.

SUMMARY OF THE PRESENT INVENTION

In view of the problems in the conventional arts, the present invention provides a rectifier mounted at a bottom of a reactor which is suitable for the bottom of the reactor and capable of forming dense and homogeneous flow at the bottom of the reactor by liquid oil.

Accordingly, in order to solve technical problems mentioned above, technical solutions adopted by the present invention are as follows.

A rectifier mounted at the bottom of a reactor, comprises a central layer, at least one interlayer and an external layer, which are made of bird nest honeycomb ceramic, wherein honeycomb porosities of the central layer, the interlayer and the external layer increase in turn. The three layers are made of honeycomb ceramic. The central layer, the interlayer and the external layer are respectively provided in a central-layer cone shaped body, an interlayer cone shaped body and an external-layer cone shaped body which are installed concentrically, so as to form meshed honeycomb pores with different porosities at the bottom of the rectifier.

The rectifier of the present invention is made of bird nest ceramic with high density honeycomb pores, and a minimum density thereof is over 200 meshes. For a structure of huge pore space and dense grid, and the increased honeycomb porosities in turn from center to external side, when liquid feed enters a bottom of a secondary reactor, times of water droplets analysis formed on a layer of main agent by liquid oil are greatly increased and flow thereof is better distributed. A dense and homogeneous distribution formed on the layer of the main agent by the liquid oil is capable of eliminating an effect of turbulence to the greatest extent, so as to promote the reactive performance of the liquid oil and increase the efficiency of the reactor.

Figure 1:
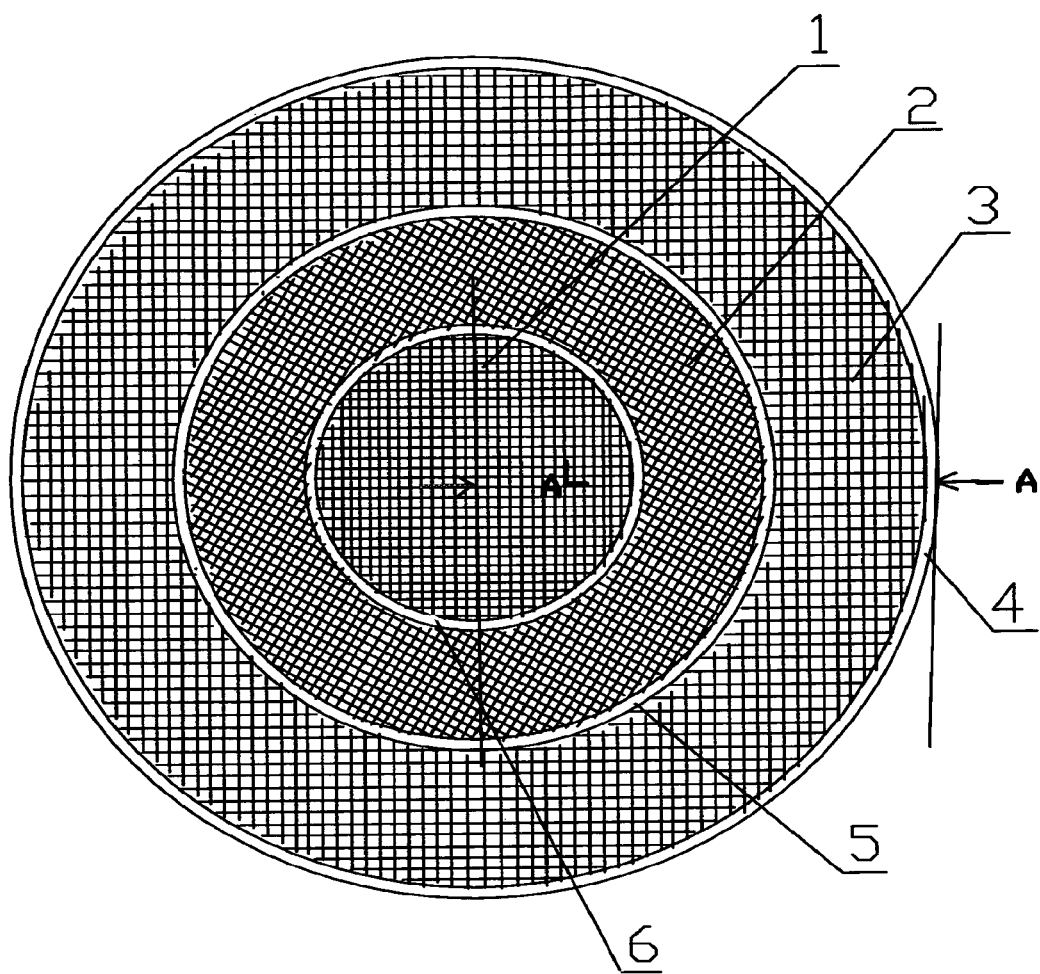
FIG. 1 is a top structural sketch view according to a preferred embodiment of the present invention.

In the drawings: 1-central layer, 2-interlayer, 3-external layer, 4-external-layer cone shaped body, 5-interlayer cone shaped body, 6-central-layer cone shaped body.

DETAILED DESCRIPTION OF THE PREFERRED EMBODIMENT

Figure 2:
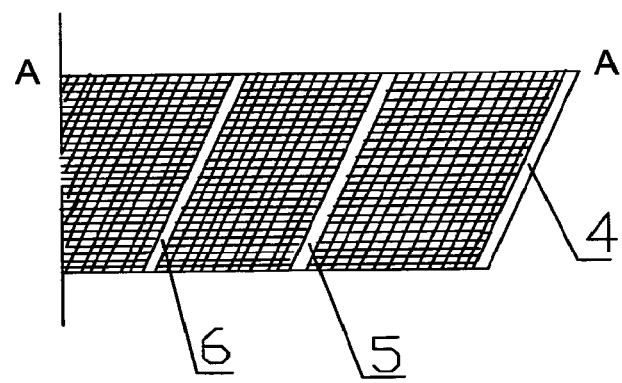
FIG. 2 is an A-A sectional view of the FIG. 1 upon a plane A-A.

Referring to FIG. 1 and FIG. 2 of the drawings, a rectifier mounted at a bottom of a reactor according to a preferred embodiment of the present invention, comprises a central layer 1, an interlayer 2 and an external layer 3, wherein the three layers are made of honeycomb ceramic, wherein the interlayer can also be embodied as two or more interlayers. Honeycomb porosity of the central layer, the interlayer and the external layer increases in turn, and honeycomb porosity density thereof are 600 meshes, 400 meshes and 200 meshes respectively. Honeycomb holes of each layer can be embodied as square holes, circular holes, hexagon holes, triangular holes or other shaped holes. The honeycomb porosities of each layer can be embodied in a same shape or in different shapes. The central layer, the interlayer and the external layer are respectively filled in a central-layer cone shaped body 6, an interlayer cone shaped body 5 and an external-layer cone shaped body 4. The central-layer cone shaped body 6, the interlayer cone shaped body 5 and the external-layer cone shaped body 4 are concentrically installed correspondingly from center to external thereof in turn, and each of the three cone shaped body is made of metal, such as stainless steel or heat resistant steel, so as to form meshed honeycomb pores with different porosities at the bottom of the rectifier. For a convenient installation, a hand ring is provided on the external-layer cone shaped body.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A rectifier comprising: a central layer (1), at least one interlayer (2) and an external layer (3), which are made of bird nest honeycomb ceramic, wherein honeycomb porosity of said central layer, said interlayer and said external layer increase in turn, said central layer, said interlayer and said external layer are respectively provided in a central-layer cone shaped body (6), an interlayer cone shaped body (5) and an external-layer cone shaped body (4) which are installed concentrically, so as to form meshed honeycomb pores with different porosities at said bottom of said rectifier.

* * * * *